(12) United States Patent
Brock et al.

(10) Patent No.: US 9,696,215 B2
(45) Date of Patent: *Jul. 4, 2017

(54) SYSTEM AND METHOD FOR FOOD SAFETY INSPECTION

(71) Applicant: NOVARUS CORPORATION, Cordova, TN (US)

(72) Inventors: Benjamin Brock, Cordova, TN (US); David Conn, Madison, MS (US)

(73) Assignee: Novarus Corporation, Cordova, TN (US)

( * ) Notice: Subject to any disclaimer, the term of this patent is extended or adjusted under 35 U.S.C. 154(b) by 32 days.

This patent is subject to a terminal disclaimer.

(21) Appl. No.: 14/518,838

(22) Filed: Oct. 20, 2014

(65) Prior Publication Data

US 2015/0285689 A1   Oct. 8, 2015

Related U.S. Application Data

(63) Continuation of application No. 13/184,656, filed on Jul. 18, 2011, now Pat. No. 8,864,042, which is a continuation of application No. 12/651,692, filed on Jan. 4, 2010, now abandoned, which is a continuation of application No. 11/229,621, filed on Sep. 20, 2005, now Pat. No. 7,686,232.

(51) Int. Cl.
| | | |
|---|---|---|
| *G01K 1/00* | (2006.01) | |
| *G01K 3/00* | (2006.01) | |
| *G01K 3/04* | (2006.01) | |
| *B60H 1/00* | (2006.01) | |
| *G01K 1/02* | (2006.01) | |
| *G01K 1/08* | (2006.01) | |
| *G01K 13/00* | (2006.01) | |

(52) U.S. Cl.
CPC .......... *G01K 3/005* (2013.01); *B60H 1/00978* (2013.01); *G01K 1/02* (2013.01); *G01K 1/08* (2013.01); *G01K 3/04* (2013.01); *G01K 13/00* (2013.01)

(58) Field of Classification Search
USPC ....................................... 374/155, 163, 208
See application file for complete search history.

(56) References Cited

U.S. PATENT DOCUMENTS

| | | |
|---|---|---|
| 3,753,259 A | 8/1973 | Donovan |
| 3,932,849 A | 1/1976 | Welch |
| 4,567,474 A | 1/1986 | Wolin |
| 4,855,721 A | 8/1989 | Hallett et al. |

(Continued)

FOREIGN PATENT DOCUMENTS

| | | |
|---|---|---|
| GB | 2229821 | 10/1990 |
| JP | 2002268739 | 9/2002 |

*Primary Examiner* — Mirellys Jagan
(74) *Attorney, Agent, or Firm* — Goodwin

(57) ABSTRACT

A system and a method for monitoring and inspecting food safety is disclosed. The system adopts insert and use concept that only requires an initial push on a button to begin its function. The system provides visual alert for different conditions if food products are in unsafe status. The system is pre-calibrated during manufacture without complicated or multi-step calibration or recalibration procedures during application. The system relies on modern surface-mount microprocessor technology that enables long-term calibration stability along with very low power consumption for extended battery life.

18 Claims, 4 Drawing Sheets

(56) References Cited

U.S. PATENT DOCUMENTS

| | | | |
|---|---|---|---|
| 4,881,057 A * | 11/1989 | Garcia | G01K 15/00 338/28 |
| 5,621,390 A * | 4/1997 | Neal | G08B 21/182 340/584 |
| 5,917,416 A | 6/1999 | Read | |
| 6,320,512 B1 | 11/2001 | Nicholson et al. | |
| 6,617,971 B2 | 9/2003 | Keller | |
| 6,850,861 B1 | 2/2005 | Faiola et al. | |
| 6,854,883 B2 | 2/2005 | Rund et al. | |
| 7,372,003 B2 | 5/2008 | Kates | |
| 7,686,232 B2 | 3/2010 | Brock et al. | |
| 2003/0112845 A1 | 6/2003 | Kaiser et al. | |
| 2003/0132841 A1 | 7/2003 | Alderman | |
| 2004/0060305 A1 | 4/2004 | Singh et al. | |
| 2004/0170213 A1 | 9/2004 | Rund et al. | |
| 2004/0170214 A1 | 9/2004 | Rund | |
| 2004/0247015 A1* | 12/2004 | Wojan | G01K 1/14 374/120 |
| 2005/0188910 A1* | 9/2005 | McCorkle | G01K 11/12 116/216 |
| 2006/0006987 A1* | 1/2006 | Hashimoto | G06K 7/0008 340/10.51 |
| 2006/0027567 A1* | 2/2006 | Biscotti | A23L 3/36 219/497 |
| 2006/0213904 A1 | 9/2006 | Kates | |
| 2006/0229850 A1* | 10/2006 | Roberts | G01D 9/005 702/188 |
| 2008/0073813 A1* | 3/2008 | Smith | B29C 45/14778 264/266 |
| 2009/0134882 A1* | 5/2009 | Schick | A61M 1/3621 324/601 |
| 2013/0301673 A1* | 11/2013 | Mobley | G01K 3/04 374/102 |

* cited by examiner

SYSTEM AND METHOD FOR FOOD SAFETY INSPECTION

CROSS-REFERENCE TO RELATED APPLICATIONS

The present application is a continuation of, and claims priority to, U.S. application Ser. No. 13/184,656, filed on Jul. 18, 2011, now U.S. Pat. No. 8,864,042, which is a continuation of U.S. application Ser. No. 12/651,692, filed on Jan. 4, 2010, now abandoned, which is a continuation of U.S. application Ser. No. 11/229,621, filed on Sep. 20, 2005, now U.S. Pat. No. 7,686,232. Each of the above-referenced applications is herein incorporated by reference in its entirety.

FIELD OF THE INVENTION

The present invention generally relates to temperature measurement and, more particularly, to food safety inspection.

BACKGROUND OF THE INVENTION

In food service industry, during the course of transferring products from either cold storage or normal cooking status to some designated place, food safety is a big concern. Regulatory authority and the food service industry have established that potentially hazardous food products maintained either below 40.degree. F. or above 140.degree. F. are generally safe from the growth of potentially dangerous bacteria. Thus, the temperature window roughly between 40.degree. F. and 140.degree. F. can be considered to be a danger zone. To ensure food safety, a simple and effective inspection method for monitoring food temperature and then alerting if food temperature is in a danger zone is desired.

SUMMARY OF THE INVENTION

Therefore, an object of the present invention is to provide an easy-to-use food inspection device and method that ensures that potentially hazardous food products are in safe status.

Another object of the present invention is to provide a visual alert if the potentially hazardous food products are in unsafe status so that people are warned in time to adopt necessary measures to ensure food safety.

In accordance with one aspect of this invention, a system and method of inspecting potentially hazardous food products adopts a simple and straightforward insert and use concept that only requires an initial push on a button to begin its function.

In accordance with another aspect of this invention, a system and method of inspecting potentially hazardous food products provides different visual alerts for different conditions if the potentially hazardous food is in the danger zone.

In accordance with a further aspect of this invention, a system and method of inspecting potentially hazardous food products is pre-calibrated during manufacture using sensitive thermistor temperature sensors and thus can eliminate or reduce complicated or multi-step calibration or recalibration procedures during application.

In accordance with a yet further aspect of this invention, a system and method of inspecting potentially hazardous products relies on microprocessor technology that enables long-term calibration stability along with very low power consumption for extended battery life.

The above and other objects, features, and advantages of the present invention will be apparent in the following detailed description of the preferred embodiments of the present invention when read in conjunction with the accompanying drawings.

DETAILED DESCRIPTION OF THE INVENTION

Figure 1:
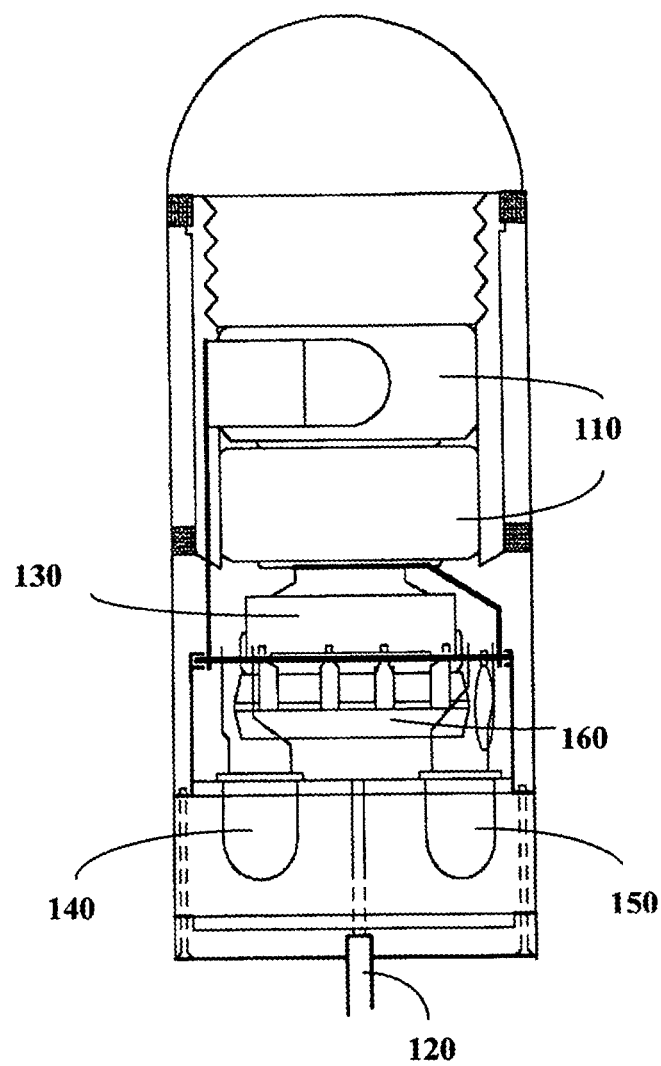
FIG. 1 is a diagram of one embodiment of a food safety inspection device according to the invention.

FIG. 1 is a diagram of one embodiment of a food safety inspection device 100 for ensuring that the potentially hazardous food products (referred to "foods" thereafter) are in safe condition, i.e., the food temperatures are either below a lower temperature threshold (e.g., about 40.degree. F.) or above a higher temperature threshold (e.g., about 140.degree. F.), and providing a visual alert if the foods are in unsafe status, i.e., the food temperatures fall between the lower temperature threshold (e.g., about 40.degree. F.) and the higher temperature threshold (e.g., about 140.degree. F.), according to the invention.

It should be understood that the range of 40.degree. F. to 140.degree. F. is exemplary only, and that the device can be configured to operate according to different ranges without departing from the spirit and the scope of the invention. For example, a range of 30.degree. F. to 150.degree. F., or any other range suitable to the application, could be used.

The food safety inspection device 100 includes a power source 110, a temperature sensor 120, a reset mechanism 130, a warning mechanism (140, or 150, or 140 and 150), and a processor 160.

The food safety inspection device 100 is powered by a power source 110, which supplies power to electronic components of the device. The power source can be either a DC or an AC power supply. The DC power supply can be any suitable commercial batteries available on the market.

The temperature sensor 120 is used as a medium to physically touch the inspected food and thus sense the temperature of the food. Of course, the sensor could be applied to physically touch a container holding the food (a plat, a can, et.) in addition to or instead of physically touching the food. According to one approach, the temperature sensor consists of a sensor tip and a thermistor which is physically located in the sensor tip's sheath; the sensing tip is about 6 inches in length and made up of stainless steel. Any suitable device for sensing or measuring temperature could be used.

The reset mechanism 130 is used to reset the device so that a measurement can be initiated. According to one approach, the reset mechanism can be made as a pushable button. Any other suitable mechanism for resetting the device could be used, such as toggle switch, etc.

The warning mechanism (140, or 150, or 140 and 150) is used to provide a warning when the inspected food is in unsafe status. The warning mechanism can be either in audio or visual form, or both. The audio form can be any indicium which can give off an audio warning such as beeping. The visual form can be any visual indicium which can give off a visual warning (e.g., flashing) such as light emitting diodes and light bulbs, or other suitable device for providing a visual indicia. According to one approach, the device has one visual indicium which can flash a color when alerting. According to another approach, the device has two visual indicia, when alerting, one giving off a red flashing warning 140 corresponding to one condition and the other giving off a blue flashing warning 150 corresponding to another condition.

The processor 160 is used to process measured data corresponding to the temperature of the inspected food. According to one approach, the processor 160 determines whether the food temperature falls below the lower temperature threshold or exceeds the higher temperature threshold, determines whether the food temperature falls between the lower temperature threshold and the higher temperature threshold, determine whether the food temperature falls between the lower temperature threshold and the middle temperature setpoint, and determine whether the food temperature falls between the middle temperature setpoint and the higher temperature threshold. Preferably, the processor comprises a memory, internal registers, a clock, and outputs. According to one embodiment, ATTiny13 AVR microprocessor is adopted. Other types of processors or controller-type devices could easily be used.

Figure 2A:
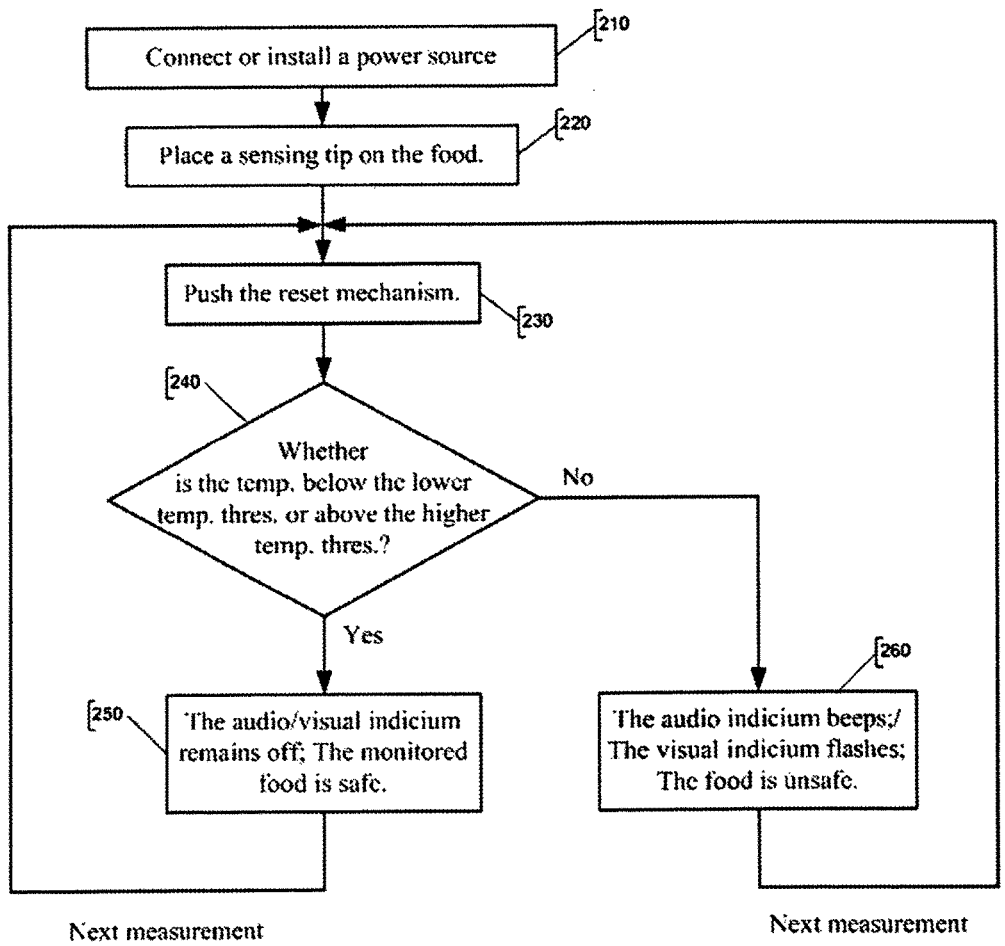
FIGS. 2(a) and 2(b) are flowcharts illustrating a method for the operation of the food safety inspection device according to an embodiment of the invention.
Figure 2B:
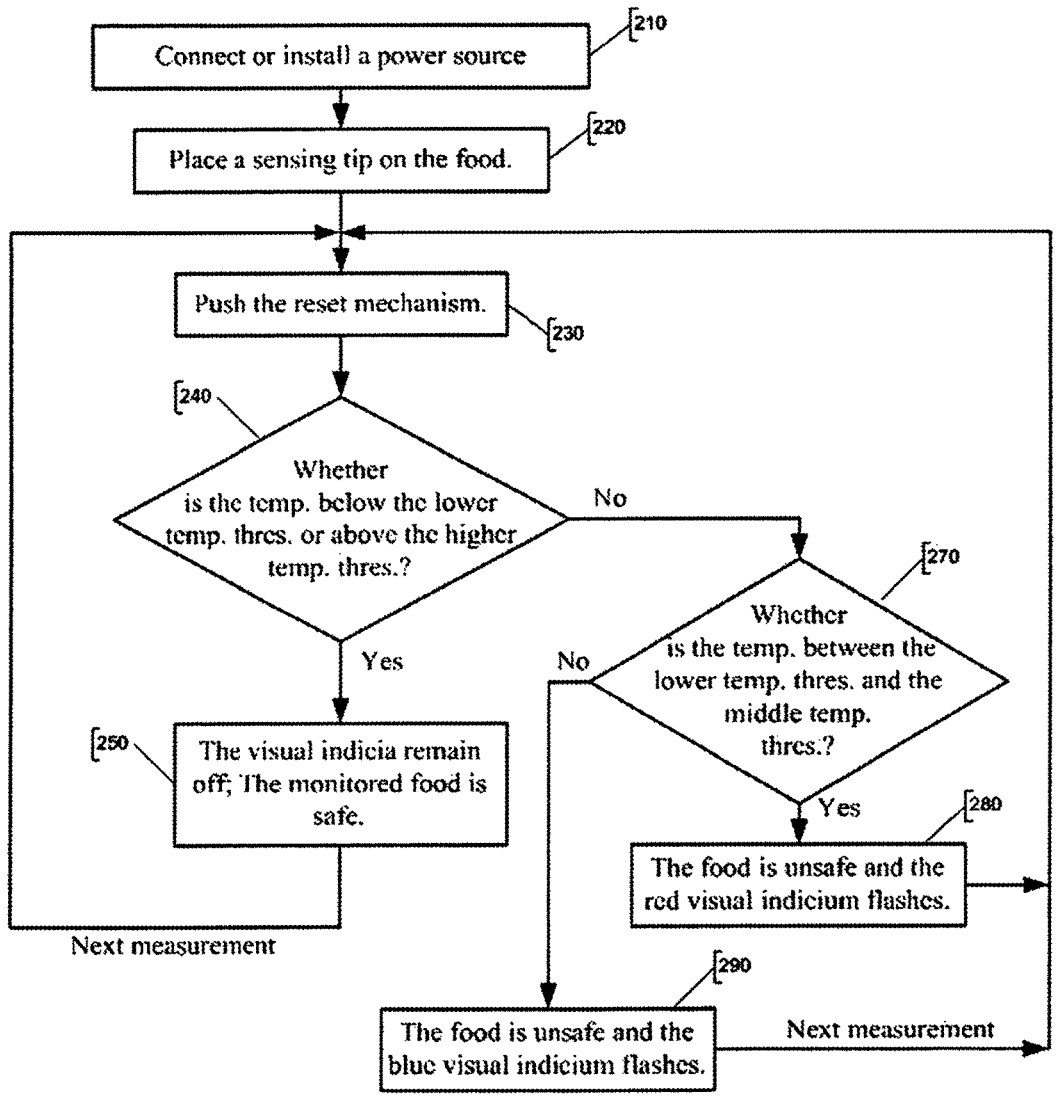

FIG. 2(*a*) is a flowchart illustrating the operation of a food safety inspection device with an audio indicium or one visual indicium as its warning mechanism according to one embodiment of the invention. FIG. 2(*b*) is a flowchart illustrating the operation of the food safety inspection device with two visual indicia as its warning mechanism according to another embodiment of the invention. The method of FIGS. 2*a* and 2*b* is described in connection with FIG. 1 in order to set forth the method in a concrete fashion easily understood by the person of ordinary skill. However, this articulation of the method is exemplary only, and the method could be implemented using structures different from that of FIG. 1.

The user of the device first connects or installs a power source before the device is ready to inspect food as set forth in step 210. The user then places the temperature sensor of the device on or into the food so that the temperature sensor physically touches the inspected food as per step 220. According to step 230, a reset mechanism is pushed to initiate the device. According to one approach, if the device uses an audio indicium as its warning mechanism, the device then beeps to indicate that the device is measuring the temperature of the inspected food. According to another approach, if the device uses one visual indicium (or two visual indicia) as its warning mechanism, the visual indicium (or indicia) light(s) up for several seconds (e.g., about 2 seconds).

According to one embodiment (i.e., the device uses audio indicium), when the monitored food is cold (e.g., below about 40.degree. F.), such as meat just taken out from a refrigerator, if the food safety inspection device is applied, the audio indicium remains off, which means the monitored food is in safe status and no safety action needs to be undertaken, as per steps 240 and 250. When the monitored food is hot (e.g., above 140.degree. F.), such as just-cooked soup, if the food safety inspection device is applied, the audio indicium remains off, which represents the monitored food is also in safe status and no safety action needs to be undertaken, as per steps 240 and 250.

Similarly, according to another embodiment (i.e., the device uses one visual indicium [or two visual indicia]), when the monitored food is cold (e.g., below about 40.degree. F.), if the food safety inspection device is applied, the visual warning indicium (or indicia) remains off, as per steps 240 and 250. When the monitored food is hot (e.g., above 140.degree. F.), if the food safety inspection device is applied, the visual warning indicium (indicia) remain off, as per steps 240 and 250.

When initially cold food is removed from cold storage and exposed to a warmer environment for certain period of time, e.g., a salad container is taken out from a refrigerator and placed on a counter for later serving, the temperature of the food gradually increases. Once the temperature of the monitored food increases over a lower threshold (e.g., about 40.degree. F.), the audio indicium or visual indicium (or indicia) gives off a warning. According to one approach (i.e., the device uses an audio indicium), the device starts to beep until the reset mechanism is pushed, which indicates that the monitored food is on unsafe condition, as per step 260. According to another approach (i.e., the device has one visual indicium), the device starts to flash in a fast blinking mode until the reset mechanism is pushed, as per step 260. According to one further approach (i.e., the device has two visual indicia), the red visual indicium starts to flash until the reset mechanism is pushed, as per steps 270 and 280.

Likewise, when initially hot food is exposed to air for a while, e.g., a just-cooked soup, the temperature of the food gradually decreases. Once the temperature of the monitored food decreases below the higher temperature threshold (e.g., about 140.degree. F.), the audio indicium or visual indicium (or indicia) gives off warning. According to one approach (i.e., the device uses an audio indicium), the device starts to beep until the reset mechanism is pushed, which indicates that the monitored food is on unsafe condition, as per step 260. According to another approach (i.e., the device has one visual indicium), the device starts to flash until the reset mechanism is pushed, as per step 260. According to one further approach (i.e., the device has two visual indicia), the blue visual indicium starts to flash until the reset mechanism is pushed, as per steps 270 and 290.

If the temperature of the monitored food is around the middle of temperature range between the lower temperature threshold (e.g., about 40.degree. F.) and the higher temperature threshold (e.g., about 140.degree. F.), according to one embodiment (i.e., the device uses two visual indicia), the red indicium flashes when the monitored food is below a roughly middle temperature setpoint (e.g., about 90.degree. F.) as per step 280, and the blue indicium will flash when the monitored food is above the roughly middle temperature setpoint (e.g. about 90.degree. F.) as per step 290.

The flash of the visual indicium can alert relevant personnel so that some action can be taken. For example, the temperature of the initially hot foods can be raised up above the higher temperature threshold (e.g., about 140.degree. F.), or the temperature of the initially cold foods can be lowered down below the lower temperature threshold (e.g., about 40.degree. F.). Thus, the monitored foods can be monitored or returned to a safe condition. Of course, if the food is in unsafe status, the establishment can simply dispose of the food rather than returning it to a safe temperature.

Figure 3:
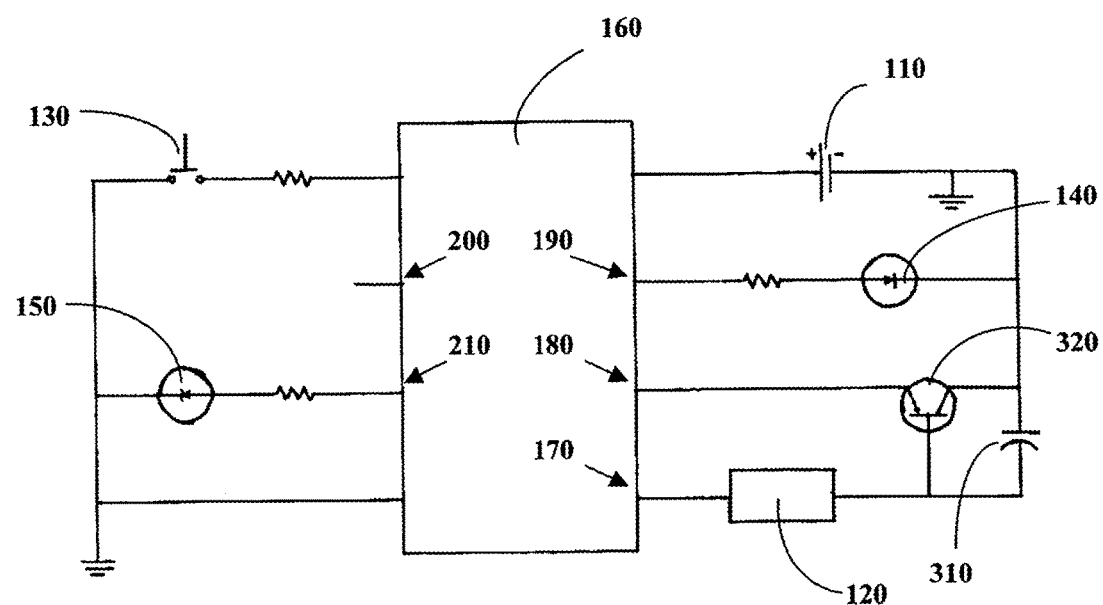
FIG. 3 is a diagram of another embodiment of the food safety inspection device according to the invention.

FIG. 3 illustrates how a food safety inspection device measures the temperature of the inspected food according to an embodiment of the invention.

To initiate a measurement cycle, the output ports 170 and 180 are first driven low for a time period proportional to a time constant, where the time constant is the product of the thermistor 120 resistance, R, and capacitor's 310 capacitance, C. This allows enough time for the capacitor, C, to fully discharge. Then both output ports 170 and 180 are driven high, charging the capacitor through the thermistor's resistance. Once the capacitor becomes adequately charged, the transistor 320 turns on and pulls the output port 180 low. The time for the output port 180 to be driven from high to low by the transistor 250 is a function of R.times.C.times-.Constant of the Circuit. Since the resistance, R, of the thermistor is related to temperature of the sensor, the time lapse is directly related to the temperature. The processor's internal clock is used to measure this time lapse.

By means of a calibration procedure during manufacture, the time lapses are calibrated to correspond to the designated temperatures, and programmed into the processor 160. By matching the measured time lapse with the calibrated value stored in the processor 160, the processor 160 can determine the actual temperature of the monitored food and thus whether the food is in safe or unsafe status.

According to one embodiment, the processor can transmit the temperature data to a remote receiver at a designated interval to keep a record of temperature history. The remote receiver could be any device which is able to receive, save, and display the transmitted data. The processor could transmit the data through a wired connection (e.g., cables) or through a wireless connection (e.g., RF transmitter, etc.). The data can be forwarded over a network (Internet, Intranet, etc.) to be monitored and further evaluated.

One variation of the present invention is that the food safety inspection device could be mounted on coolers. For example, when the cooler goes above 40.degree. F., the device will flash a red light to alert people about the safety status of the foods in the cooler. Modification of the sensor 120 may be appropriate for this application so that the sensor can be easily attached to the inner wall of the cooler. The temperature sensor 120 can be detached from the other components of the device so that the sensor is located inside the cooler and the other components of the device are attached or located outside the cooler.

One further variation of the present invention is that the device is redesigned so that it can float in a bath tub when a mother prepares for bathing a baby. If the bath water is too hot (i.e., above some specific temperature), the device will flash and alert the mother so that the mother can adjust the bath temperature to ensure the comfort and safety of the baby. This embodiment could be implemented using the basic components of FIG. 1, and with the addition of some protective material to waterproof the device and provide for buoyancy.

A specific embodiment of the food safety inspection device according to the invention has been described for the purpose of illustrating the manner in which the invention may be made and used. It should be understood that implementation of other variations and modifications of the invention in its various aspects will be apparent to those skilled in the art and that the invention is not limited by the specific embodiment described. It is therefore contemplated to cover by the present invention any and all modifications, variations, or equivalents that fall within the true spirit and scope of the basic underlying principles disclosed and claimed herein.

The invention claimed is:

1. A device for evaluating food safety, comprising:
a processor for processing measured data corresponding to a food temperature, the processor programmed to determine whether the food temperature falls within a predefined safety zone or a predefined danger zone, said predefined danger zone being bound by a first temperature setpoint and a second temperature setpoint wherein the first temperature setpoint is lower than the second temperature setpoint, and said predefined safety zone being temperature ranges outside said predefined danger zone;
a storage device for storing measured data corresponding to the food temperature;
a sensor for insertion or making physical contact with one or more food items and for outputting the measured data corresponding to the food temperature;
a one-touch switch for initiating measurement by said sensor with a single push or other single movement of a finger; and
an indicator for providing a food safety warning either in audio or visual form when the food temperature is in said predefined danger zone between said first temperature setpoint and said second temperature setpoint.

2. The device of claim 1, wherein said indicator is configured to provide one visual indicium which remains off when the food temperature is in said predefined safety zone, and wherein the visual indicium provides a visual alert when the food temperature falls in said predefined danger zone.

3. The device of claim 1, wherein said indicator is configured to provide at least one audio indicium to warn the user when the food temperature falls in said predefined danger zone.

4. The device of claim 1, comprising a sensing tip for providing a physical contact with the food.

5. The device of claim 1, comprising a switch for resetting said device to start or restart operation.

6. The device of claim 1, further comprising one or more batteries for supplying power to the device.

7. The device of claim 1, further comprising a remote receiver which receives, saves and/or displays the measured temperature data at a designated interval.

8. The device of claim 1, wherein the sensor is calibrated during manufacture to establish a corresponding relationship between the measured data and the food temperature.

9. The device of claim 1, wherein said indicator is configured to provide two visual indicia which remain off when the food temperature is in said predefined safety zone, and wherein the two visual indicia provide a visual alert in different colors when the food temperature falls in said predefined danger zone, one color for when the food temperature is above the first temperature setpoint and below a third temperature setpoint, and the other color for when the food temperature is below the second temperature setpoint and above the third temperature setpoint.

10. The device of claim 9, wherein the third temperature setpoint is between the first temperature setpoint and the second temperature setpoint.

11. A method of evaluating food safety, comprising:
placing a sensor that is part of a food safety measurement device in physical contact with one or more food items;
engaging a one-touch switch for initiating a measurement by said sensor with a single push or other discrete movement of a finger;
measuring, using a processor, data corresponding to a temperature of the one or more food items via the sensor; and
determining, by the processor, whether the food temperature falls within a predefined safety zone or a predefined danger zone, said predefined danger zone being bound by a first temperature setpoint and a second temperature setpoint wherein the first temperature setpoint is lower than the second temperature setpoint, and said predefined safety zone being temperature ranges outside said predefined danger zone; and alerting a user with a food safety warning either in audio or visual form when the food temperature is in said predefined danger zone between said first temperature setpoint and said second temperature setpoint.

12. The method of claim 11, further comprising:
resetting said device to start or restart operation.

13. The method of claim 11, further comprising:
calibrating said device to establish corresponding relationship between the measured data and the food temperature; and
storing said relationship in said device.

14. The method of claim 11, further comprising:
providing no visual alert when the food temperature is in said predefined safety zone.

15. The method of claim 11, further comprising:
providing at least one audio indicium to warn the user when the food temperature falls in said predefined danger zone.

16. The method of claim 11, further comprising:
receiving, saving, and/or displaying the measured temperature data at a designated interval via a remote receiver.

17. The method of claim 11, further comprising:
providing a visual alert when the food temperature falls in said predefined danger zone.

18. The method of claim 17, further comprising
providing a first visual alert of one color when the food temperature is above the first temperature setpoint and below a third temperature setpoint, the third temperature setpoint being between the first temperature setpoint and the second temperature setpoint; and
providing a second visual alert of another color when the food temperature is below the second temperature setpoint and above the third temperature setpoint.

* * * * *